United States Patent [19]

Dahle

[11] 4,135,391
[45] Jan. 23, 1979

[54] TORQUE TRANSDUCER

[75] Inventor: Orvar Dahle, Västerås, Sweden

[73] Assignee: ASEA Aktiebolag, Västerås, Sweden

[21] Appl. No.: 853,871

[22] Filed: Nov. 22, 1977

[51] Int. Cl.² ............................................. G01L 3/10
[52] U.S. Cl. ............................. 73/136 A; 73/DIG. 2; 324/209
[58] Field of Search ...................... 73/136 A, DIG. 2; 324/209

[56] References Cited

U.S. PATENT DOCUMENTS

| | | | |
|---|---|---|---|
| 2,553,833 | 5/1951 | Rifenbergh | 73/DIG. 2 |
| 2,912,642 | 11/1959 | Dahle | 73/DIG. 2 |
| 3,340,729 | 9/1967 | Scoppe | 73/DIG. 2 |

Primary Examiner—Charles A. Ruehl
Attorney, Agent, or Firm—Watson, Cole, Grindle & Watson

[57] ABSTRACT

A torque transducer for measuring the torque in the outgoing crankshaft of automobile engines comprises two two-pole magnetic cores, arranged perpendicular to each other, with coils around the poles. The coils of one core are adapted to be supplied with alternating current for generation of an alternating field in the surface of the shaft. The second core with its coils is adapted to sense the changes in the alternating field which are caused by the torque of the engine. The poles of the primary core are located opposite to diametrically opposed points on the crankshaft.

5 Claims, 4 Drawing Figures

TORQUE TRANSDUCER

BACKGROUND OF THE INVENTION

The present invention relates to a torque transducer, preferably intended to be used when measuring the torque in the outgoing crankshaft of automobile engines.

In the automobile industry there is a need of a torque transducer which shall be capable of being placed between the engine housing and the flywheel and which more or less surrounds the crankshaft. Since the space in the longitudinal direction is very limited here, there is no room for an annular torque transducer, for example of the type which is shown and described in U.S. Pat. No. 3,011,340. In addition, the power requirement and the cost of such a multi-polar transducer are far too high. A cruciform transducer according to U.S. Pat. No. 2,912,642 would be more favourable considering the power requirement and the cost, but using a normal, concentrated mode of construction such a transducer will surround only a small part of the circumference of the shaft and the shaft must therefore rotate practically a full turn before the internal stress configuration prevailing in the shaft surface has been scanned over the whole circumference, so that a measurement value independent of the internal stresses can be formed. Since the automobile industry desires a response time of at the most 50 ms, the lowest engine speed for correct measurement — if the necessary filter time constant could be made negligible by using a high supply frequency — would be 60 · 1000/50 = 1200 revolutions per minute, which is not acceptable. It must be possible to determine the torque at considerably lower engine speeds.

SUMMARY OF THE INVENTION

With a transducer according to the present invention, two diametrically opposed scanning points are obtained on the circumference of the engine shaft. Thus, the lowest speed for correct measurement is reduced to 600 revolutions per minute, which is below the range of revolutions in question and is therefore acceptable. According to the invention, the shaft circumference is scanned twice per revolution by constructing the primary core so as to encompass half the shaft and with two salient poles provided with windings, which poles are located diametrically opposite to each other. On the other hand, only one secondary core is required, which is suitably attached to the primary core symmetrically between the primary poles by way of non-magnetic spacers to separate the fluxes in the two cores. The secondary core can be made of solid, magnetic material since the secondary flux is so small that the surface layer determined by the penetration depth of the flux is quite sufficient. For reasons of space in the axial extension of the transducer the distance between the secondary poles must be made only about one-sixth of the optimum distance, which is normally equal to the distance between the primary poles along the shaft surface. The reduction in sensitivity thus obtained is, however, only to about one-third, which results in quite satisfactory level of the measurement signal. The fact that it is possible to obtain two complete scannings of the torsional stress in the circumference of the shaft for each revolution using only one secondary core may seem like a contradiction. The explanation thereof will be given later on in connection with the detailed description of the transducer.

BRIEF DESCRIPTION OF THE DRAWINGS

The transducer according to the invention will be described with reference to the accompanying drawings.

DETAILED DESCRIPTION OF THE INVENTION

Figure 1:
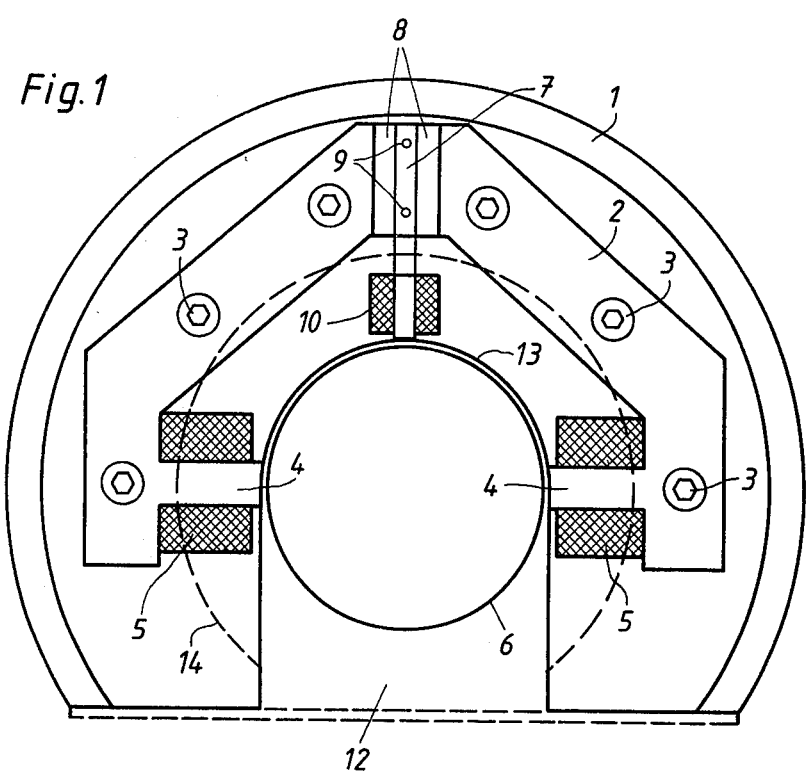
FIG. 1 shows a frontal view of the transducer (without casing)
Figure 2:
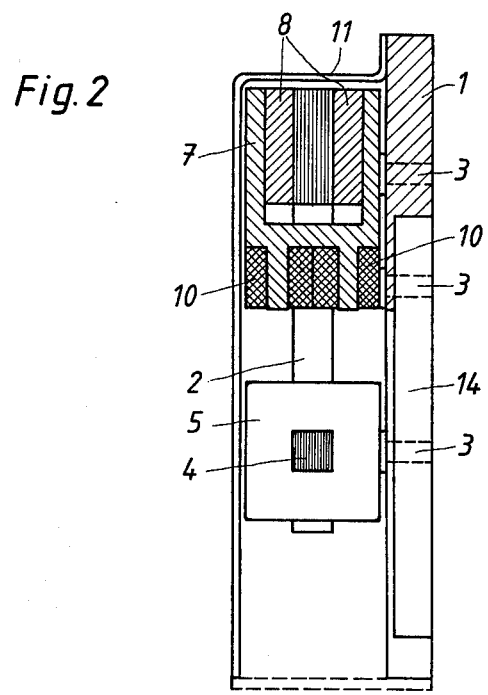
FIG. 2 is a section along the line II—II in FIG. 1.

The transducer shown in FIGS. 1 and 2 is mounted on a base plate 1. The primary core 2 of the transducer is attached to the plate by means of screws 3. The core has two primary poles 4, each supporting a winding 5 for generation of a magnetic flux in the surface of the engine shaft. The position of the engine shaft, when the transducer is mounted, is marked by the circle 6 in FIG. 1. The primary core supports the secondary core 7, which is fastened right between the primary poles by means of spacers 8 of nonmagnetic material and rivets 9. The secondary core supports the two secondary windings 10. The two cores with windings are covered by a casing 11 which is attached to the base plate 1. Both the casing 11 and the plate 1 have a slot 12 open downwardly which, at the top, terminates in an arc-shaped edge 13, the radius of which is somewhat larger than the radius of the engine shaft. The slot makes it possible to place the transducer in position around the engine shaft. The turned cavity 14 of the base plate 1 is intended to fit over a corresponding flange on the engine housing around the outgoing crankshaft. This makes it possible to ensure a well centered mounting of the pole surfaces of the transducer in relation to the shaft. However, this presupposes that the outside of the flange is concentric with the shaft. From FIG. 2 it is also clear that the pole distance of the secondary core is chosen so that the distance between the outer edges of the two secondary coils 10 is substantially equal to the extension of the coils of the primary core in the longitudinal direction of the engine shaft.

Figure 3:
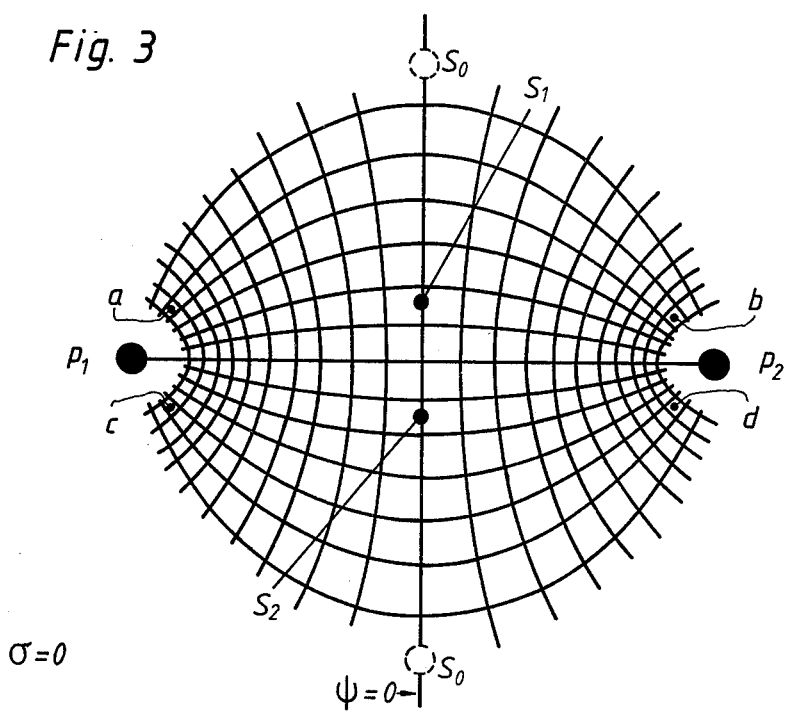
FIG. 3 shows the field configuration in the shaft surface in unloaded state.
Figure 4:
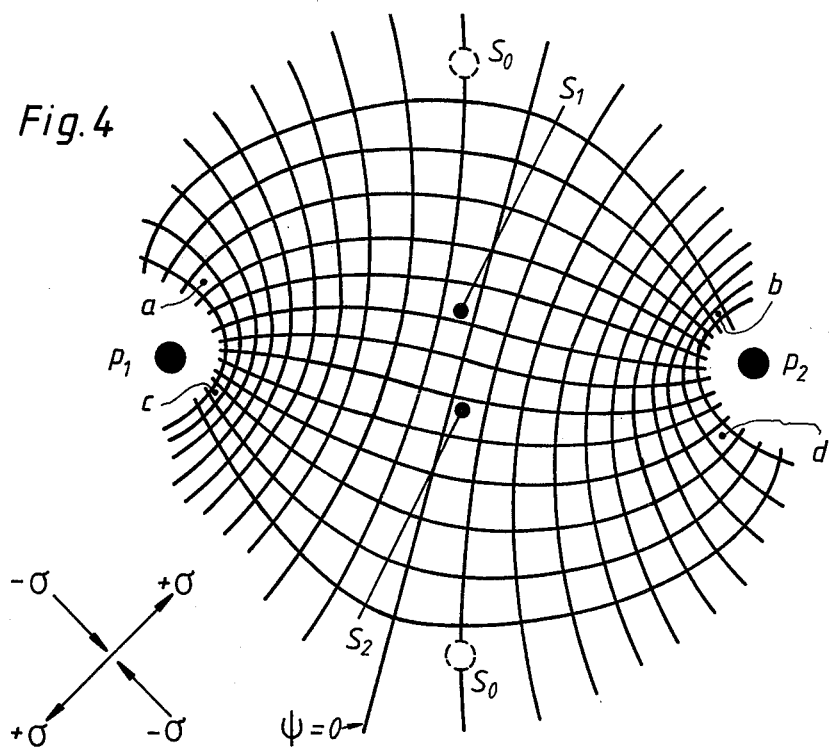
FIG. 4 shows the field configuration in a torque-loaded shaft.

FIG. 3 shows the field configuration for a stress-free condition in the evolved shaft surface with projections $P_1$ and $P_2$ of the primary poles 4 and projections $S_1$ and $S_2$ of the secondary poles 7. FIG. 4 shows the field configuration of a torque-loaded shaft, which is indicated by the principal stresses $\pm \sigma$. It should be noted in this connection that the filed configurations show the H field and the magnetic equipotential lines perpendicular to the H lines. The projections of the secondary poles are drawn with a considerably smaller distance than the distance between the projections of the primary poles, since the secondary core in the object of the invention must be made short because of the fact that the available distance in the axial direction of the transducer is limited. This means that the transducer has less sensitivity than in the normal embodiment when the same pole distance is used for both the primary and the secondary circuits. In the stress-free state according to FIG. 3, the field configuration becomes completely symmetrical and the two secondary poles $S_1$ and $S_2$ are positioned right opposite to the same equipotential line, which results in the secondary flux and the secondary voltage becoming zero.

When a torque is applied, such as shown in FIG. 4, the field configuration is distorted and this distortion is almost entirely caused by the changes in the potential falls in the vicinity of the four points a, b, c, d where the predominant part of the potential fall in the shaft surface is concentrated and where the field strength at the same time is substantially parallel to either of the principal stresses $\pm\sigma$. The distortion in the centre of the field, where the magnetic potential difference between the secondary poles is sensed, is thus a resulting phenomenon which is caused by the shear stresses adjacent to the primary poles. Therefore, with two diametrically located primary poles the whole shaft circumference can be scanned during half a revolution and the average value of the internal stresses of the shaft be formed during the corresponding time.

In both FIGS. 3 and 4 dashed rings $S_o$ mark the positions for the projections of the secondary poles in the field configuration in the normal case, when the same pole distance is used for both primary and secondary cores. FIG. 3 shows that in the unloaded state the projections of the secondary poles lie on the equipotential line $\chi = 0$. In the loaded state according to FIG. 4, this line is distorted so that points $S_o$ are located at a certain distance from the line, which distance is determining for the secondary signal. FIG. 4 also shows that although the secondary poles are moved considerably closer to one another, they are, however, located at a distance from line $\chi = 0$, which should be sufficient for generation of a secondary voltage which is sufficient for measuring the applied torque.

I claim:

1. Torque transducer preferably intended for measuring the torque in the outgoing crankshaft of automobile engines and comprising two two-pole magnetic cores, arranged perpendicular to each other, with coils around the poles, of which one core, the primary core, with coils is arranged to be supplied with alternating current for generation of a magnetic alternating field in the surface of the shaft and the second core, the secondary core, with coils is arranged for sensing the changes in said alternating field which are caused by the applied torque, in which the poles of the primary core are located right in front of diametrically opposite points on the crankshaft, whereby the time for magnetic stress measurement over the entire circumference of the shaft is reduced to one half compared with the corresponding measuring time in case of a primary pole distance comprising only a small part of the circumference of the shaft.

2. Transducer according to claim 1, in which the pole distance of the secondary core is chosen so that the distance between the outer edges of the secondary coils is substantially equal to the extension of the coils of the primary core in the longitudinal direction of the crankshaft.

3. Transducer according to claim 1, in which the secondary core is made of solid magnetic material and is fastened to the primary core by means of spacers of non-magnetic material.

4. Transducer according to claim 1, in which the secondary core is symmetrically attached between the primary poles.

5. Transducer according to claim 1, in which the transducer is mounted on a base plate which is provided with a turned cavity intended to fit over a corresponding flange on the engine housing for centering the pole system of the transducer in relation to the crankshaft of the engine.

* * * * *